United States Patent [19]

Ware et al.

[11] Patent Number: 5,011,593

[45] Date of Patent: Apr. 30, 1991

[54] CATALYTIC HYDRODESULFURIZATION

[75] Inventors: Robert A. Ware, Wyndmoor, Pa.; Stephen S. Wong, Medford, N.J.

[73] Assignee: Mobil Oil Corporation, Fairfax, Va.

[21] Appl. No.: 442,870

[22] Filed: Nov. 20, 1989

[51] Int. Cl.$^5$ .............................................. C10G 1/00
[52] U.S. Cl. .................................. 208/213; 208/211; 208/216 R; 208/97
[58] Field of Search .............. 208/211, 213, 97, 216 R

[56] References Cited

U.S. PATENT DOCUMENTS

| | | | |
|---|---|---|---|
| 3,308,069 | 3/1967 | Wadlinger et al. | 502/77 |
| 3,625,880 | 12/1971 | Hamner et al. | 208/213 |
| 4,411,770 | 10/1983 | Chen et al. | 208/213 |
| 4,419,220 | 12/1983 | LaPierre et al. | 208/DIG. 2 |
| 4,592,828 | 6/1986 | Chu et al. | 208/213 |
| 4,864,067 | 9/1989 | Harandi et al. | 208/213 |

OTHER PUBLICATIONS

"Studies in Surface Science and Catalysis", (1986), vol. 28, *New Developments in Zeolite Science and Technology*, Ed. Murakami et al., Elsevier.

*Primary Examiner*—Helane E. Myers
*Attorney, Agent, or Firm*—Alexander J. McKillop; Charles J. Speciale; Malcolm D. Keen

[57] ABSTRACT

A hydrodesulfurization process for catalytically hydrosulfurizing highly aromatic feeds, especially catalytically cracked feeds such as light cycle oils from catalytic cracking processes and aromatic extracts, employs a hydrodesulfurization catalyst containing zeolite beta. The zeolite beta based catalyst is more effective for effecting desulfurization than comparable amorphous catalysts or catalysts based on other large pore size zeolite and is capable of achieving a high degree of desulfurization at relatively low levels of conversion. The hydrodesulfurization catalyst comprises a transition metal hydrogenation component, preferably Co/Mo, on zeolite beta together with an inert matrix. The zeolite beta based catalyst may be mixed with amorphous catalyst such as Co/Mo/alumina. The low sulfur products are useful as blending components for road diesel fuels and other distillate fuels.

19 Claims, 2 Drawing Sheets

CATALYTIC HYDRODESULFURIZATION

FIELD OF THE INVENTION

This invention relates to catalytic hydrodesulfurization and more particularly to the catalytic hydrodesulfurization of catalytically cracked hydrocarbon fractions.

BACKGROUND OF THE INVENTION

Hydrogen treating or hydrotreating is an established and important unit process in modern petroleum refining and is used with various petroleum fractions for removing heteroatom-containing contaminants such as sulfur, nitrogen, and oxygen as well as other impurities; it may also be used for saturating olefins and more unsaturated components. High pressure operation may effect partial saturation of aromatics to improve product properties or processability. Hydrotreating processes are frequently used for upgrading distillate fuels by removing sulfur and improving odor and color properties, burning qualities and, in the case of diesel fuel, cetane numbers. Hydrotreating may also be employed with catalytic cracking feeds to reduce the sulfur content of the feeds with a consequent, favorable effect on the sulfur contents of the cracking products as well as on the emissions of sulfur oxides from the cracking unit, especially the stack gases from the regenerator. The cracking properties of the feed may also be improved with more gasoline and less coke being made from hydrotreated feeds. The principal application of hydrotreating is, however, in catalytic desulfurisation since sulfur is a frequent component in petroleum-based fractions. Hydrotreating processes are described in "Petroleum Processing, Principles and Applications", R. G. Hengstebeck, McGraw- Hill, New York 1959, pp. 308-311; see also "Chemistry of Catalytic Processes", Gates et al, McGraw-Hill, New York, 1979.

Hydrotreating is generally carried out by passing the selected petroleum feedstock over a hydrotreating catalyst in the presence of hydrogen. Hydrotreating pressures typically range from about 250 to 1200 psig (1825 to 8375 kPa abs.) with higher pressures being appropriate when aromatics saturation is desired, e.g. 1500 to 2000 psig (10,445 to 13,890 kPa abs.). Temperatures, although elevated, are maintained at relatively low values since hydrogenation is exothermic with the thermodynamics of the hydrogenation reaction becoming unfavorable as temperature increases. Temperatures will typically range from about 500° to 800° F. (260° to 425° C.), and usually will be in the range of about 600° to 750° F. (315° to 400° C.). Depending upon the hydrogen consumption which will occur, hydrogen circulation rates will typically be from about 1000 to 4000 SCF/bbl (178 to 712 n.l.l.$^{-1}$). Hydrogen consumption is typically below 500 SCF/bbl (about 90 n.l.l.$^{-1}$).

The catalysts used in hydrotreating generally comprises a metal hydrogenation component on an amorphous, porous support material. The hydrogenation component comprises a transitional metal usually selected from Groups VIA and VIIIA of the Periodic Table (IUPAC Table). The preferred metals for this purpose are the base metals, especially nickel, cobalt, molybdenum and tungsten, of which cobalt and molybdenum are especially preferred, particularly in combination with one another. The support material may contribute a limited degree of acidic functionality to the catalyst which is desirable in order to effect removal of the organic heteroatoms by promoting the opening of heterocyclic rings containing these atoms at low to moderate degrees of desulfurisation. Alumina, silica-alumina and silica are the normal support materials for this purpose.

Zeolites have not usually been employed as the support, either on their own or combined with an amorphous matrix such as alumina, because of their greater activity, with the concomitant increase in conversion and reduction in yield. However, if deep desulfurisation e.g. 95% or more, is required, a greater degree of acidic functionality may be required in order to effect ring opening of heterocyclic aromatic feed components prior to conversion of the organic heteroatoms to inorganic sulfur and nitrogen. Zeolite containing catalysts of this type are reported to be effective for deep hydrodesulfurization, as described by Vrinat et al: "Catalytic Hydrodesulfurization of Dibenzothiophene Over Y-type Zeolites", Catalysis by Zeolites, B. Imelik et al (Ed.) Elsevier 1980, p. 219. Because the heteroatoms are usually contained in aromatic ring systems, a catalyst which is aromatic selective, such as zeolite Y, would be the catalyst of choice for providing the required degree of acidic functionality, as reported by Vrinat.

The problems encountered with hydrodesulfurization are especially notable with highly aromatic feeds such as the cycle oils obtained from catalytic cracking processes. These cycle oils generally comprise bicyclic and tricyclic aromatic ring compounds from which the paraffinic side chains have been removed during the catalytic cracking process. Depending upon the severity of the cracking process, short alkyl side chains may be present on these aromatics but they are relatively refractory to further catalytic cracking, even in the presence of a conventional cracking catalyst such as zeolite Y.

Zeolites, especially zeolites X and Y, have been used for some time in hydrocracking catalysts where their relatively greater activity is an asset and it has also been found that they provide excellent resistance to aging, especially with the more highly siliceous forms such as zeolite USY. Their effectiveness as a component of hydrocracking catalysts is predicated upon their aromatic selective character: they attack the aromatic components of the feed in preference to the paraffinic components. This aromatic-selective behavior of the large pore size zeolites X and Y is not, however, matched by zeolite beta, another zeolite which possesses many characteristics consistent with those of a large pore size zeolite, as noted by Higgins et al. *Zeolites* 8,446-452 (1988) and Treacy et al. *Nature* 332,249-251 (1988). Zeolite beta, by contrast, is paraffin-selective, attacking the paraffinic components of a feed in preference to the aromatics so that when a feed containing both aromatic and paraffinic comonents is processed over zeolite beta, the paraffinic components are removed first with the aromatic components tending to remain until higher conversion is attained. This paraffin-selective behavior of zeolite beta is described in U.S. Pat. No. 4,419,220 (Lapierre et al.) and EP94327. The marked selectivity of zeolite beta for paraffins in preference to aromatics implies that it would not be expected to function effectively as an acidic component in a hydrodesulfurization catalyst with highly aromatic feeds such as the cycle oils obtained from catalytic cracking and aromatic extracts from solvent extraction processes. We have found, however, that zeolite beta is unexpectedly effective as a component of hydrodesulfurization catalysts for such feeds and is able to effect a significant degree of desulfurization while maintaining relatively low levels of boiling range conversion.

SUMMARY OF THE INVENTION

According to the present invention a catalytic hydrodesulfurization process for a highly aromatic feed such as a catalytically cracked hydrocarbon fraction or an aromatic extract employs a hydrodesulfurization catalyst which contains zeolite beta as an acidic component. The catalyst also contains a metal hydrogenation component, preferably a metal of Groups VIA or VIIIA (IUPAC table), such as cobalt and molybdenum.

The present process is useful for the desulfurisation of highly aromatic feeds which have an aromatic content of at least 50 weight percent and usually higher, typically at least 70 weight percent, as discussed below. Feeds of this type include catalytically cracked feeds, especially cycle oils as well as other highly aromatic fractions such as the aromatic extracts from solvent extraction processes. The present hydrodesulfurisation process may be used for producing low sulfur distillate fuels, especially blending components for road diesel fuel. Product sulfur levels below 0.5 wt. percent sulfur may be achieved with low levels of conversion to products boiling outside the distillate range and with low levels of gas make.

THE DRAWINGS

In the accompanying drawings:
FIGS. 1 and 2 are graphs showing the performance of the zeolite beta based hydrodesulfurization catalysts using cycle oil feeds.

DETAILED DESCRIPTION

FEEDSTOCK

Figure 1:
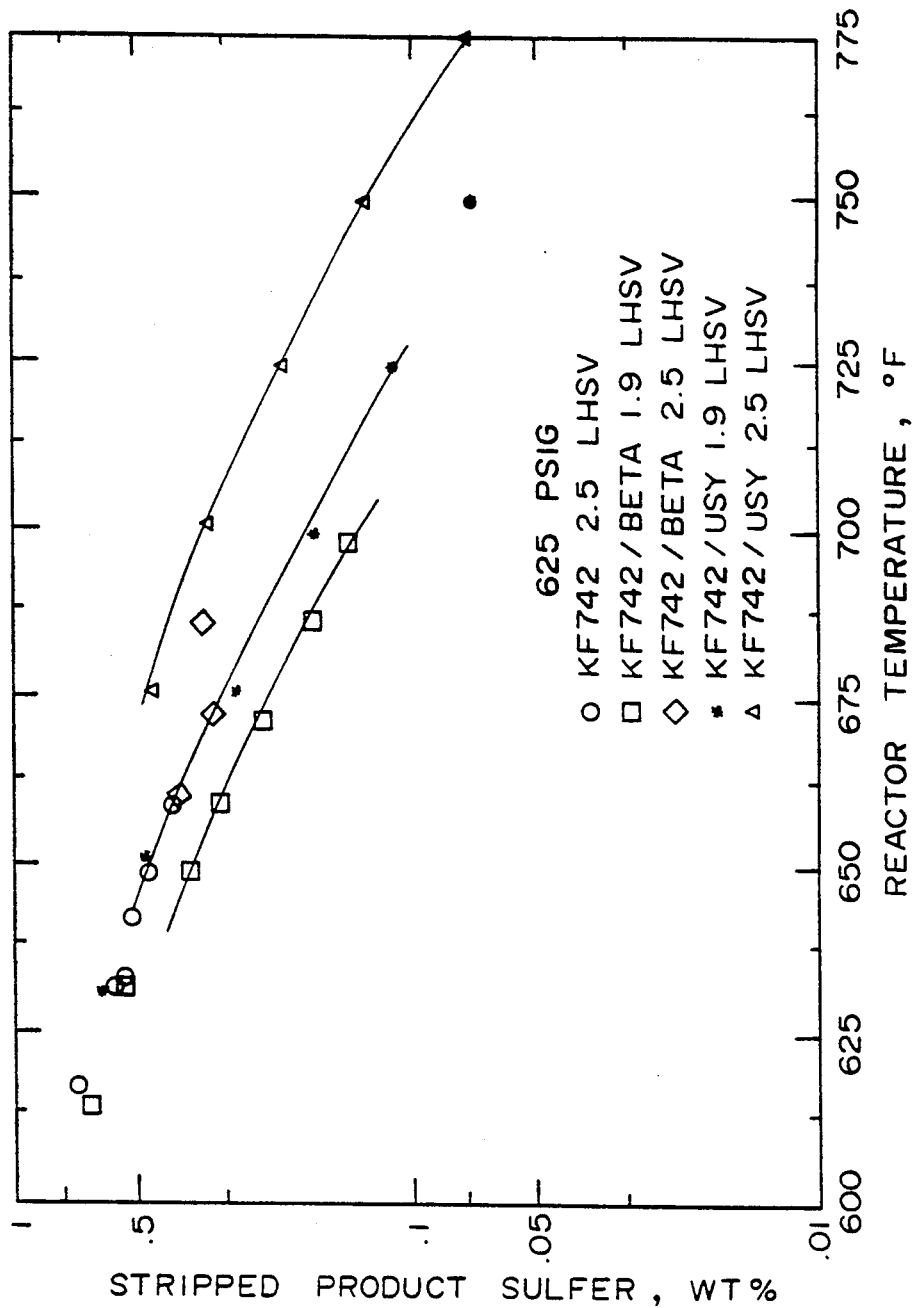

The feeds used in the present process are hydrocarbon fractions which are highly aromatic and hydrogen deficient. They are fractions which have an aromatic content in excess of 50 wt. percent; for example, 70 wt. percent or 80 wt. percent or more. Highly aromatic feeds of this type typically have hydrogen contents below 14 wt. percent, usually below 12.5 wt. percent or even lower, e.g. 8-10 wt. percent or 8-9 wt. percent. The API gravity is also a measure of the aromaticity of the feed, usually being below 30 and in most cases below 25 or even lower, e.g. below 20. In most cases the API gravity will be in the range 5 to 25 e.g. 5-15, with corresponding hydrogen contents from 8.5-12.5 wt. percent. Sulfur contents are typically from 0.5-5 wt. percent and nitrogen from 50-1000 ppmw, more usually 50-650 ppmw.

The feeds of this type which are especially useful in the present process are the dealkylated cycle oil fractions produced by a catalytic cracking operations, for example, in an FCC or TCC unit. A characteristic of catalytic cracking is that the alkyl groups, generally bulky, relatively large alkyl groups (typically but not exclusively $C_5$-$C_9$ alkyls), which are attached to aromatic moieties in the feed become removed during the course of the cracking. It is these detached alkyl groups which contribute to the gasoline fraction produced from the cracker. The aromatic moieties such as benzene, naphthalene, benzothiophenes, dibenzothiophenenes and polynuclear aromatics (PNAs) such as anthracene and phenanthrene form the high boiling products from the cracker. The mechanisms of acid-catalyzed cracking and similar reactions remove side chains of greater than 5 carbons while leaving behind short chain alkyl groups, primarily methyl, but also ethyl groups on the aromatic moieties. Thus, the "substantially dealkylated" cracking products include those aromatics with small alkyl groups, such as methyl, and ethyl, and the like still remaining as side chains, but with relatively few large alkyl groups, i.e., the $C_5$-$C_9$ groups, remaining. More than one of these short chain alkyl groups may be present, for example, one, two or more methyl groups.

The cycle oil feeds include full range cycle oils, light cycle oils, which typically have a boiling range within the range of 385°-750° F. (about 195°-400° C.), e.g., 400°-700° F. (about 205°-370° C.) or, alternatively, cycle oil fractions such as heavy cycle oil or light cycle oil fractions. If a cycle oil fraction is to be used, it may be obtained by fractionation of a full range cycle oil or by adjustment of the cut points on the cracker fractionation column. The light stream will retain the highly aromatic character of the catalytic cracking cycle oils (e.g. greater than 50% aromatics by silica gel separation) but the lighter fractions used will generally exclude the heavier polynuclear aromatics (PNAs—three rings or more) which remain in the higher boiling range fractions together with the heteroatom contaminants which are concentrated in the higher boiling fractions.

Another group of feeds which may be used in the present hydrodesulfurisation process are the aromatic extracts produced from solvent extraction processes. Solvent extraction is an established refinery process used for separating aromatic components from various hydrocarbon fractions, especially lubricant fractions, including both distillate (neutral) and residual lube fractions e.g. deasphalted oil (DAO). In solvent extraction, the feed containing aromatic and non-aromatic components is contacted with a solvent which is selective for the aromatic components e.g. furfural, phenol or N-methyl-pyrrolidone (NMP). The solvent together with the extracted aromatic materials is then separated from the non-aromatic raffinate after which the solvent is removed from the aromatic extract and recycled. The extracts are, as noted above, highly aromatic with aromatic contents above 50 weight percent and often higher, depending upon the extraction conditions used. The properties of three extracts obtained by the furfural extraction of neutral lube fractions are given below by way of example in Table 1.

TABLE I

| Extract | Lube Extract Properties | | |
|---|---|---|---|
| | A | B | C |
| Paraffins, wt. pct. | 6.00 | 2.60 | 5.50 |
| Mononaphthenes, wt. pct. | 3.80 | 1.20 | 2.40 |
| Polynaphthenes, wt. pct. | 12.80 | 5.60 | 6.10 |
| Aromatics, wt. pct. | 77.40 | 90.60 | 86.00 |
| Sulfur, wt. pct. | 3.50 | 4.8 | 4.6 |
| Nitrogen, wt. pct. | 0.1 | 0.26 | 0.2 |
| Aniline Point, °F. | 186.0 | 104.4 | 84.5 |

CATALYSTS

The catalysts used for the present hydrodesulfurization process are bifunctional, heterogeneous, porous solid catalysts possessing both acidic and hydrogenation functionality. Because the aromatic feeds contain relatively bulky bicyclic and tricyclic aromatic components the catalyst is required to have a pore size which is sufficiently large to admit these materials to the interior structure of the catalyst where the acid-catalyzed ring opening reactions can take place in order to effect removal of the heteroatoms under deep desulfurisation conditions. Zeolite beta possesses pore size of the requisite magnitude provided by the twelve-membered ring system which is possessed by zeolite beta. Zeolite beta is a known zeolite and is described in U.S. Pat. No. 3,308,069 (Wadlinger) to which reference is made for a description of this catalyst, its properties and preparation. Its use in catalytic dewaxing processes is described in U.S. Pat. No. 4,419,220 (LaPierre) to which reference is also made for a further description of this catalyst and its use in dewaxing processes.

The catalyst also contains a binder, typically an amorphous inorganic oxide material such as alumina, silica-alimina or silica and this binder typically comprises from about 30 to 80 percent of the catalyst (excluding metal hydrogenation component). Because the zeolite provides the desired acidic functionality to the catalyst, the matrix may be essentially non-acidic and is preferably so in order to obtain the maximum benefit of the zeolite beta so that non-selective conversion during the process is maintained at a desirably low level. A further description of suitable matrix materials and of compositing methods may be found in U.S. Pat. No. 4,789,457 (Fischer) to which reference is made for such a description.

The present hydrodesulfurization catalysts also have a metal component to provide the necessary hydrogenation functionality. Suitable hydrogenation components include the metals of Groups VIA and VIIIA of the Periodic Table (IUPAC Table) such as tungsten, vanadium, zinc, molybdenum, rhenium, nickel, cobalt, chromium, manganese, or a noble metal such as platinum or palladium, in an amount between 0.1 and about 25 wt %, normally 0.1 to 5 wt % especially for noble metals, and preferably 0.3 to 3 wt %. This component can be exchanged or impregnated into the composition, using a suitable compound of the metal. The compounds used for incorporating the metal component into the catalyst can usually be divided into compounds in which the metal is present in the cation of the compound and compounds in which it is present in the anion of the compound. Compounds which contain the metal as a neutral complex may also be employed. The compounds which contain the metal in the ionic state are generally used, although cationic forms of the metal, e.g. $Pt(NH_3)_4^{2+}$, have the advantage that they will exchange onto the zeolite. Anionic complex ions such as vanadate or metatungstate which are commonly employed can however be impregnated onto the zeolite/binder composite without difficulty in the conventional manner since the binder is able to absorb the anions physically on its porous structure. Higher proportions of binder will enable higher amounts of these complex ions to be impregnated. Thus, suitable platinum compounds include chloroplatinic acid and various compounds containing the platinum amine complex.

Base metal components, especially cobalt either alone or with molybdenum, or nickel either alone or mixed with tungsten or molybdenum are particularly preferred in the present process.

PROCESS CONDITIONS

During the hydrodesulfurization process the objective is to convert organic sulfur to inorganic sulfur in the form of hydrogen sulfide and any other heteroatoms present, especially nitrogen, to their corresponding inorganic forms which may be removed from the effluent in a suitable separator. Although the required ring opening reactions will be accompanied by some degree of conversion caused by cracking to lower boiling fractions, it is desired to maintain the conversion at as low a level as possible consistent with the required degree of desulfurisation. Conversion below the initial boiling point of the feed may be maintained below 10% at 80-95% hydrodesulfurization although slightly higher conversions up to 15% may be required to achieve very high degrees of desulfurization (over 95%) to produce very low sulfur products such as 0.05% S distillate fuels. In order to promote the hydrodesulfurization while maintaining low conversion levels, relatively moderate temperatures will be used, typically in the range of 550° to 800° F. (290° to 425° C.), more usually 600° to 750° F. (about 315° to 400° C.). Since aromatic saturation is not in itself an objective of the process, relatively low to moderate hydrogen pressures may be used, usually in the range of 250 to 1500 psig (1825 to 10,445 kPa abs.) and more usually in the range of 400 to 1200 psig (2860 to 8375 kPa abs.). Hydrogen circulation rates are typically 500 to 3000 SCF/bbl (about 90 to 535 $n.l.l.^{-1}$, more usually in the range of 1000 to 2000 SCF/bbl (about 180 to 360 $n.l.l.^{-1}$), with hydrogen consumption usually being below 1000 SCF/bbl (about 180 $n.l.l.^{-1}$), typically in the range 400 to 800 SCF/bbl (72 to 144 $n.l.l.^{-1}$). Space velocity is usually in the range 0.5 to 5 $hr^{-1}$ (LHSV), typically about 1.5 to 3.0 LHSV. The actual conditions used will depend upon the feed characteristics and the degree of desulfurization which is to be achieved: with relatively higher degrees of desulfurization desired, higher severity operation e.g. higher temperatures, lower space velocities or both, will be appropriate in order to effect a greater degree of ring opening and removal of heteroatoms in the aromatic components of the feed. Thus, with product sulfur contents in the range of 0.05 to 0.5 weight % sulfur, temperatures of 600° to about 700° F. (about 315° to 370° C.) may be employed whereas at product sulfur levels below 0.05 weight %, temperatures of from about 680° to 750° F. (360° to 400° C.) may be required. The use of higher hydrogen pressures correlates well with increased desulfurization and it has been found that desulfurization is improved by the use of pressures in the range of 1000 to 1200 psig (about 7000 to 8375 kPa abs.) as compared to lower pressures e.g. 625 psig (4410 kPa abs) at temperatures up to about 750° F. (about 400° C.).

As noted above, one objective of the process is to minimize conversion to products boiling outside the product boiling range and it has been found that zeolite beta is effective for this purpose. Typically the conversion to products boiling below the initial boiling point of the feed is below 10%, typically 4 to 8% at 80 to 95% hydrodesulfurization although the conversion may be slightly higher, about 10 to 15 weight percent with deeper desulfurization e.g. to produce products containing less than 0.05 weight % sulfur.

As noted above, a high degree of desulfurization is achieved with the present catalyst, and it is possible readily to produce products containing less than 0.5 weight % sulfur or, with deeper desulfurization, less than 0.1 weight % e.g. 0.05 wt.pct. sulfur. This is a significant advantage, particularly when coupled with the low levels of conversion that are achieved, maintaining relatively high product yields. With projected regulations on the sulfur content of distillate fuel, especially motor diesel, which can now be foreseen—possibly to a maximum sulfur content of 0.1 or even 0.05 weight percent in specific markets—this is a particular advantage of the present process.

The zeolite beta-based hydrodesulfurisation catalysts of the present invention may be used in conjunction with other hydrodesulfurisation catalysts, such as amorphous catalysts e.g. co/Mo on alumina, or catalysts which contain other zeolites, especially zeolite Y. The zeolite beta-based hydrodesulfurization catalysts exhibit better desulfurization activity than catalysts based on zeolite Y but zeolite Y based catalysts are relatively better for denitrogenation. Although denitrogenation is not as important as the present for distillate fuel production, it may be possible to effect good denitrogenation concurrently with the desulfurization by using a mixed catalyst containing both zeolite beta and zeolite Y as acidic components if this objective is desired. The differing activities between the two zeolites indicates, however, the unexpected nature of the desulfurization activity of zeolite beta with the present feeds. Mixtures of the two catalysts may be used or, alternatively, the reactor may be loaded with the two catalysts in sequence, for example, with an initial bed of an amorphous hydotreating catalyst such as $Co/Mo/Al_2O_3$, followed by the zeolite beta hydrodesulfurisation catalyst.

Although there is no current theoretical foundation for this observation, it is theorized that zeolite beta works on the back end components (high boiling components) of the feed by removing methyl groups on substituted dibenzothiophenes and similar compounds which contain the bulk of the sulfur in the feeds. These methyl groups sterically protect the sulfur heteroatom from hydrogenation by the metal component of the hydrotreating catalyst. The removal of these methyl groups may take place by cracking or isomerization to a different position on the dibenzothiophene molecule where they do not produce any steric shielding of the sulfur heteroatom. Nevertheless, the improved performance of zeolite beta as compared to zeolite Y, another large pore size zeolite cannot be fully explained at the present although it is possible that the diffusion distance in zeolite beta permits zeolite molecules to enter and leave faster permitting the desired reactions to take place while minimizing undesirable conversion.

EXAMPLES

The work reported below was carried out with a light cycle oil (LCO) produced from a catalytic cracking process which had a nominal 440°-700° F. (225°-370° C.) boiling range and possessed the following characteristics:

TABLE 2

| LCO Properties | |
|---|---|
| Specific Gravity | 0.996 |
| API | 11.5 |
| Hydrogen, wt. pct. | 9.0–9.1 |
| Sulfur, wt. pct. | 3.5 |
| Nitrogen, ppmw | 650 |
| P/N/A, wt. pct. | 7.2/6.5/86.3 |

The catalysts used were a nickel tungsten/zeolite beta catalyst, a nickel tungsten/USY catalyst (both having a catalyst alpha of 50) and an amorphous $CoMo/Al_2O_3$ commercial hydrodesulfurization catalyst (Ketjen KF742). The properties of these catalysts were as follows:

TABLE 3

| Catalyst | KF-742 | NiW/Beta | NiW/USY |
|---|---|---|---|
| Zeolite | — | Zeolite-Beta | USY |
| Support | $Al_2O_3$ | 50% $Al_2O_3$ | 50% $Al_2O_3$ |
| Alpha (extrudate) | — | 55 | 50 |
| Metals, wt % | | | |
| Ni | | 3.8 | 3.7 |
| Mo | 9.1 | — | — |
| W | | 14.0 | 13.5 |
| Co | 3.3 | — | — |
| Surface Area, m²/g | 260 | 263 | 240 |
| Pore Volume, cc/g | 0.51 | 0.57 | 0.64 |
| Ave. Pore Dia., Å | 77 | 87 | 107 |

EXAMPLE 1

The light cycle oil was desulfurized at 625 psig $H_2$ (4410 kPa abs.) partial pressure using reactor temperatures from 600° to 775° F. (about 315° to 415° C.) with a hydrogen circulation rate of 1500 SCF/Bbl(267 n.l.l.$^{-l}$) to achieve stripped product sulfur levels in the range of 0.05 to 1 weight %. Space velocities were 1.9 and 2.5 LHSV ($hr^{-1}$).

The following runs were made using the catalysts shown below at the space velocities indicated.
1. KF742; 2.5 LHSV
2. KF742/zeolite beta; 1.9 LHSV
3. KF742/zeolite beta; 2.5 LHSV
4. KF742/USY; 1.9 LHSV
5. KF742/USY; 2.5 LHSV The zeolite catalysts were evaluated in combination with KF742, using a catalyst bed consisting of 54 wt.percent KF742 followed by 46 wt. percent of a 50/50 mixture of KF742 and the zeolite catalyst.

The results of these runs are shown in FIG. 1.

The data using the mixed KF742/beta catalyst at 1.9 LHSV represents an equivalent 2.5 LHSV on the CoMo catalyst component and accordingly is at a comparable space velocity. The data show a higher desulfurization activity for the mixed catalyst than for the amorphous (KF742) catalyst alone so that the zeolite beta component is contributing to the improved desulfurisation shown. When the mixed KF742/zeolite beta system is run at 2.5 overall LHSV (Run No. 3), the activity is similar to KF742 alone (Run No. 1) at 2.5 LHSV. The analogous runs with nickel tungsten/USY catalysts mixed with the amorphous catalyst show that at 1.9 LHSV the KF742/USY mixture is nearly equivalent in activity to KF742 alone, indicating very little hydrodesulfurization contribution from the nickel tungsten/USY component. At 2.5 overall LHSV the KF742/USY system is less active than KF742 alone whereas at this same overall space velocity, the catalyst system including the zeolite beta component is approximately 15° F. (8.3° C.) more active than the USY system.

Figure 2:
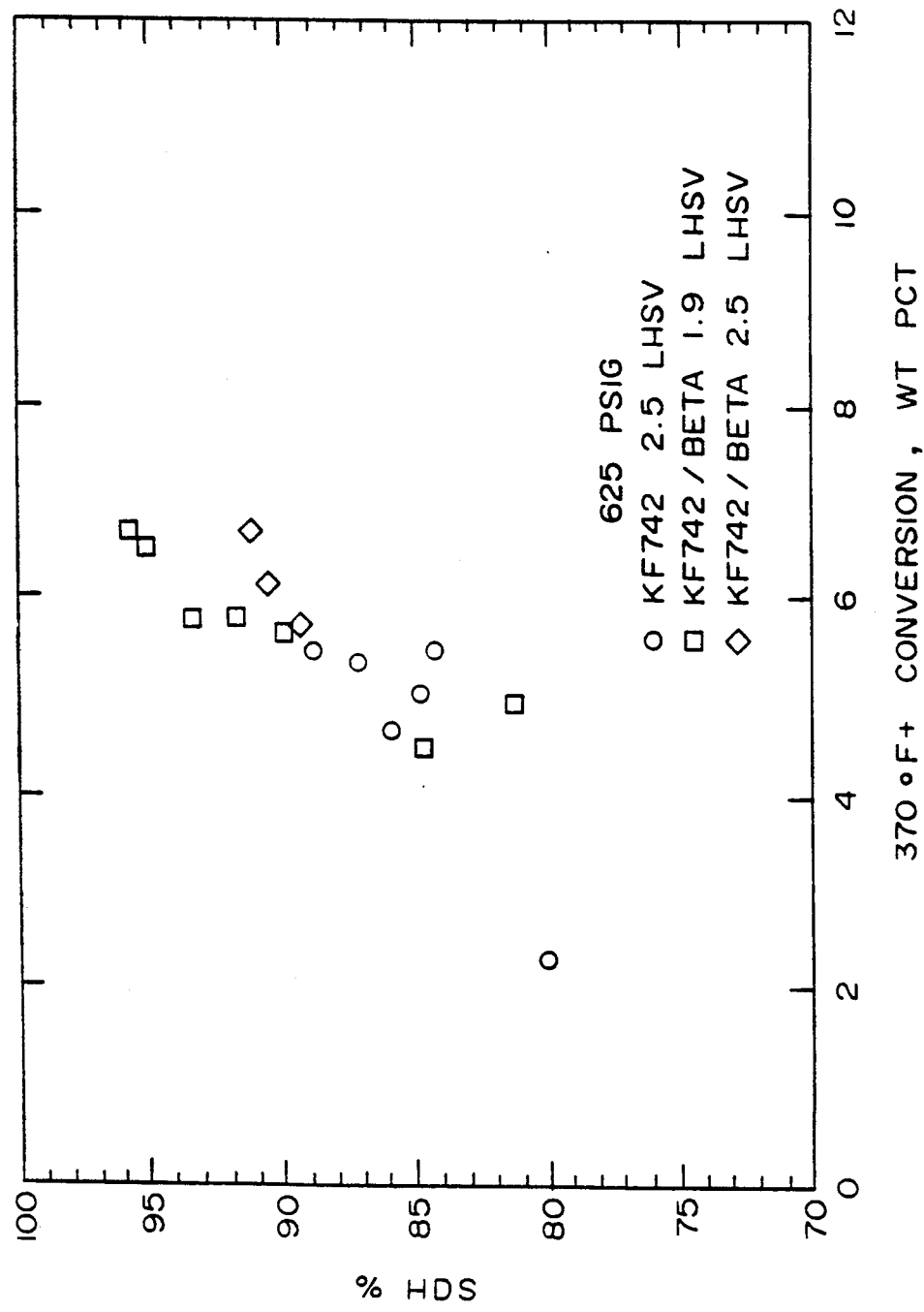

FIG. 2 shows the degree of desulfurization relative to the IBP conversion for the amorphous and amorphous/zeolite beta catalyst systems. At 1.9 LHSV the KF742/zeolite beta system achieved a significantly greater degree of desulfurization relative to conversion than the amorphous catalyst alone and at the same overall 2.5 LHSV the same result is perceptible. Thus, the catalyst containing the zeolite beta component is more effective for desulfurization than the amorphous catalyst even though the nickel tungsten metal component on the zeolite beta based catalyst is known to be less effective for hydrodesulfurization than the Co/Mo on the amorphous catalyst.

We claim:

1. A process for the hydrodesulfurization of a aromatic hydrocarbon fraction having an aromatic content of at least 50 weight percent, which comprises contacting the fraction in the presence of hydrogen at a hydrogen partial pressure from 400 to 1200 psig, a temperature from 600° to 750° F. and at a conversion relative to the initial boiling point of the hydrocarbon fraction of less than 10 percent by weight, with a hydrodesulfurization catalyst comprising a metal hydrogenation component and zeolite beta.

2. A process according to claim 1 in which the hydrocarbon fraction has an aromatic content of at least 70 weight percent.

3. A process according to claim 2 in which the hydrocarbon fraction has an aromatic content of at least 80 weight percent.

4. A process according to claim 1 in which the hydrocarbon fraction has an API gravity from 8 to 20.

5. A process according to claim 4 in which the hydrocarbon fraction has an API gravity from 8 to 15.

6. A process according to claim 5 in which the hydrocarbon fraction has a hydrogen content from 8 to 10 weight percent.

7. A process according to claim 1 in which the hydrocarbon fraction has an sulfur content from 2.5 to 5 weight percent.

8. A process according to claim 1 in which the aromatic fraction is a catalytically cracked cycle oil produced by the catalytic cracking of a petroleum feedstock.

9. A process according to claim 8 in which the cycle oil has a boiling range within the range of 400° to 800° F.

10. A process according to claim 3 in which the cycle oil has a boiling range in the range of 400° to 750° F.

11. A process according to claim 1 in which the aromatic fraction is an aromatic extract.

12. A process according to claim 1 in which the hydrodesulfurization catalyst includes at least one transition metal of Group VIA or VIIIA as the hydrogenation component.

13. A process according to claim 12 in which the hydrogenation component comprises cobalt and molybdenum.

14. A process according to claim 1 in which the zeolite beta has a silica;alumina ratio from 30:1 to b 3:00:1.

15. A process according to claim 1 in which the zeolite betas hydrodesulfurisation catalyst is mixed with an amorphous hydrodesulfurisation catalyst.

16. A process according to claim 1 in which the hydrocarbon fraction is contacted with the catalyst at a temperature from 600° to 750° F., a hydrogen partial pressure of from 400 to 1200 psig and a space velocity from 0.5 to 5 LHSV.

17. A process according to claim 1 in which the hydrodesulfurized product contains less than 0.5 weight percent sulfur.

18. A process according to claim in which the degree of desulfurization is from 80 to 95 percent.

19. A process according to claim 1 in which the conversion relative to the initial boiling point of the hydrocarbon fraction is from 4 to 8 weight percent.

* * * * *